D. CHASE.
Improvement in Dogs for Saw-Mills.
No. 126,930.        Patented May 21, 1872.
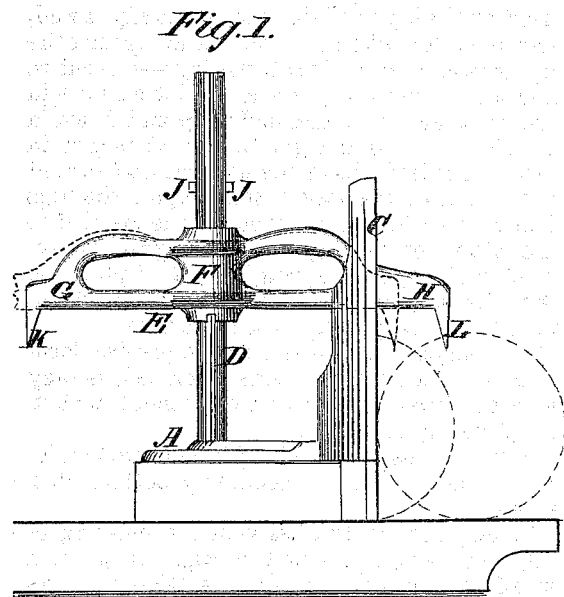
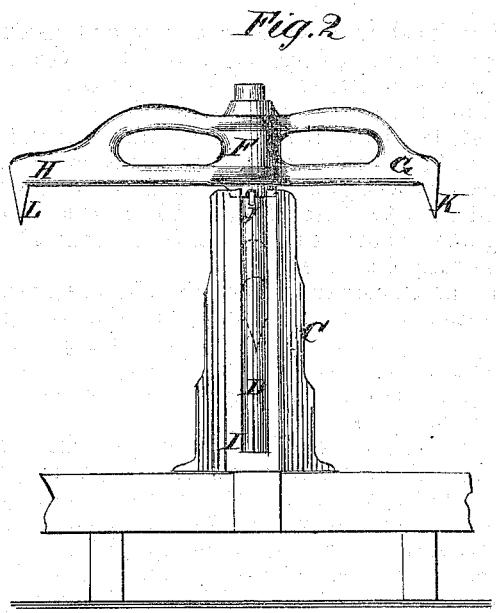
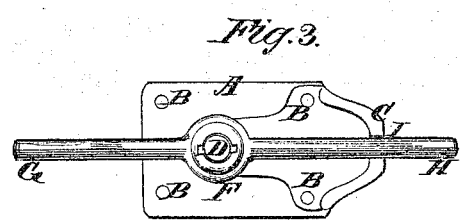
Witnesses:
John Becker
W. A. Graham
Inventor:
D. Chase
per Munn & Co
Attorneys.

126,930

UNITED STATES PATENT OFFICE.

DENISON CHASE, OF ORANGE, MASSACHUSETTS.

IMPROVEMENT IN DOGS FOR SAW-MILLS.

Specification forming part of Letters Patent No. 126,930, dated May 21, 1872.

Specification describing a new and useful Improvement in Dogs for Saw-Mills, invented by DENISON CHASE, of Orange, in the county of Franklin and State of Massachusetts.

This invention relates to apparatus used in saw-mills for holding logs to be sawed, more especially designed for circular-saw mills, but applicable to other mills; and it consists in a dog the construction of which is hereinafter more fully described.

In the accompanying drawing, Figure 1 represents a side view, showing the dog as applied. Fig. 2 is a front view, showing it as disengaged. Fig. 3 is a top view.

Similar letters of reference indicate corresponding parts.

The dog consists of a bed-plate, A, which is fixed to a head-block by bolts or screws through the holes B, to which is attached a slotted upright, C, against which the log rests when partly sawed. In rear of the upright guide C is the stand or round bar D, which carries the dog proper E. This stand is attached rigidly to the bed-plate, and the dog E is fitted to it so that it will slide up and down on it. In either direction from the central sleeve F of this dog are two arms, G and H, each furnished with a claw or finger, K L, for entering the log of different lengths—one being used on the log until the latter is partly sawed, and the other when it is turned up against the upright, as seen in Fig. 1, the logs—one entire and one turned—being seen in dotted lines in the drawing. The dog slides up and down in the slot I of the upright C, and when not in use it is raised above the upright and turned round out of the way, resting upon the lugs J J, as seen in Fig. 2. This dog is applied to the middle of the log, and is designed to prevent the log from springing out of place, so that the lumber sawed will be of even thickness on the edges and otherwise true.

I do not confine myself to the precise form or arrangement of the parts described, as they may be varied in many ways without departing from my invention.

Having thus described my invention, I claim as new and desire to secure by Letters Patent—

A dog for holding saw-logs, consisting of the bed-plate A, slotted upright C, vertical stand D, and dog proper E, substantially as described.

DENISON CHASE.

Witnesses:
HIRAM WOODWARD,
LEWIS R. HOWE.